United States Patent
Mondal et al.

(10) Patent No.: US 11,347,599 B2
(45) Date of Patent: May 31, 2022

(54) IMPROVING THE RECOVERY TIME OBJECTIVE OF BACKUP RECOVERY FROM THE CLOUD

(71) Applicant: EMC IP Holding Company LLC, Hopkinton, MA (US)

(72) Inventors: Santi Gopal Mondal, Bangalore (IN); Kalyan C. Gunda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/022,067

(22) Filed: Sep. 15, 2020

(65) Prior Publication Data

US 2022/0083432 A1 Mar. 17, 2022

(51) Int. Cl.
*G06F 11/00* (2006.01)
*G06F 11/14* (2006.01)

(52) U.S. Cl.
CPC ...... *G06F 11/1464* (2013.01); *G06F 11/1453* (2013.01); *G06F 11/1469* (2013.01)

(58) Field of Classification Search
CPC ............. G06F 11/1464; G06F 11/1453; G06F 11/1469; G06F 11/0727; G06F 11/1466; G06F 11/1458; G06F 11/1471; G06F 11/1448; G06F 11/1456; G06F 16/125; G06F 16/183

See application file for complete search history.

(56) References Cited

U.S. PATENT DOCUMENTS

| | | | | |
|---|---|---|---|---|
| 10,055,420 B1* | 8/2018 | Pogde | ................ | G06F 11/1448 |
| 10,102,083 B1* | 10/2018 | Dobrean | ............... | G06F 16/113 |
| 10,114,705 B1* | 10/2018 | Kumar | ................ | G06F 11/1469 |
| 10,430,285 B2* | 10/2019 | Hutchison | ............ | G06F 16/113 |
| 2016/0070618 A1* | 3/2016 | Pundir | ................. | G06F 3/0619 |
| | | | | 714/6.23 |
| 2018/0157561 A1* | 6/2018 | Venkatesh | ............ | G06F 3/0619 |
| 2018/0275881 A1* | 9/2018 | Ashraf | .................... | G06F 3/065 |

* cited by examiner

*Primary Examiner* — Joseph D Manoskey
(74) *Attorney, Agent, or Firm* — Staniford Tomita LLP

(57) ABSTRACT

Embodiments for performing data recovery from cloud storage to a backup appliance that goes from an offline state to an online state, including identifying super metadata among metadata stored in the cloud storage for the backup appliance, wherein the super metadata comprises an amount on the order of ten percent of the metadata representing a minimum amount of information to reconstruct the metadata, copying the super metadata blocks from the cloud storage to local metadata storage of the backup appliance while it is in the offline state to leave remaining metadata, and copying the remaining metadata blocks from the cloud storage to the local metadata storage while the backup appliance is in the online state.

13 Claims, 7 Drawing Sheets

IMPROVING THE RECOVERY TIME OBJECTIVE OF BACKUP RECOVERY FROM THE CLOUD

TECHNICAL FIELD

This invention relates generally to data recovery, and more particularly to systems and methods for improving recovery time objectives of backup recovery from cloud storage.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms easier and more reliable. Large-scale cloud computing infrastructure and services are often provided by cloud providers that maintain data centers that may be located long distances from many of the users. Cloud networks are widely used for large-scale data backup operations by enterprises that process large amounts of data on a regular basis, such as weekly or daily company-wide backups. Cloud storage (the "cloud tier") is typically associated with long-term storage of data that is stored for archival purposes and infrequently accessed, while local network storage (the "active tier") is associated with presently processed data.

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication. Certain deduplication file systems (e.g., EMC Data Domain) implement a multi-tiered deduplication file system that allows files to be moved between cloud and active tiers, while maintaining one namespace. The cost and access speed of cloud versus active tiers can be significant. Cloud storage is generally much cheaper but slower than active tier storage, which is often SSD or HDD storage media local to a node.

Large-scale storage networks use backup appliances to store customer backups in a space efficient manner and move data to a faster tier so that it can be served as and when the backups need to be restored. However, these backups may also need to be stored for longer time periods (e.g., multi-years) to meet the compliance requirements of various government or private agencies. To achieve this, customers typically store their operational copies in a faster tier and store the long-term copies in a low-cost, slower tier. For all practical purposes, these archives are stored in the cloud as a slower tier with decreased ownership cost, either with on-premises private cloud networks or through public cloud service providers (such as Amazon Web Services, AWS). Modern file systems which cater to backup workloads for data protection tend to keep a copy of the file system metadata, such as the namespace, index node (inode) trees, block allocation tables and so on, in the cloud along with long term retention (LTR) data so that the backed up data can be recovered in the event of a disaster or a primary site loss.

Traditionally, a Disaster Recovery (DR) procedure involves recovering metadata first to an on-premises store by copying required metadata from the cloud store before recovering the actual data. The time taken to copy required metadata is a function of the size of the metadata and the network bandwidth of the downlink from the cloud. In larger appliances (e.g., petabyte storage device), this may require days or even weeks together just for the recovery of metadata before any data can be recovered, assuming a minimum metadata overhead of 10%. This lengthy time requirement can be significantly increased if the system needs to recover data from a public cloud. For example, in a large deduplication backup appliance, the total amount of filesystem metadata could be on the order of 100 TB presuming that a petabyte (PB) storage capacity is fully utilized. If it is connected to a cloud provider over a Gigabit Ethernet link with an average download speed of 700 Mb/Sec (with other latencies factored in), it may take on the order of 300+ days just to copy metadata back to the storage media. Moreover, additional time to sanitize and rebuild part of the metadata, such as the index table in a deduplication filesystem may be needed, even before the appliance can serve the customer needs. This is a serious concern in terms of backup recovery time objectives (RTO) of typical disaster recovery and large-scale data storage systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
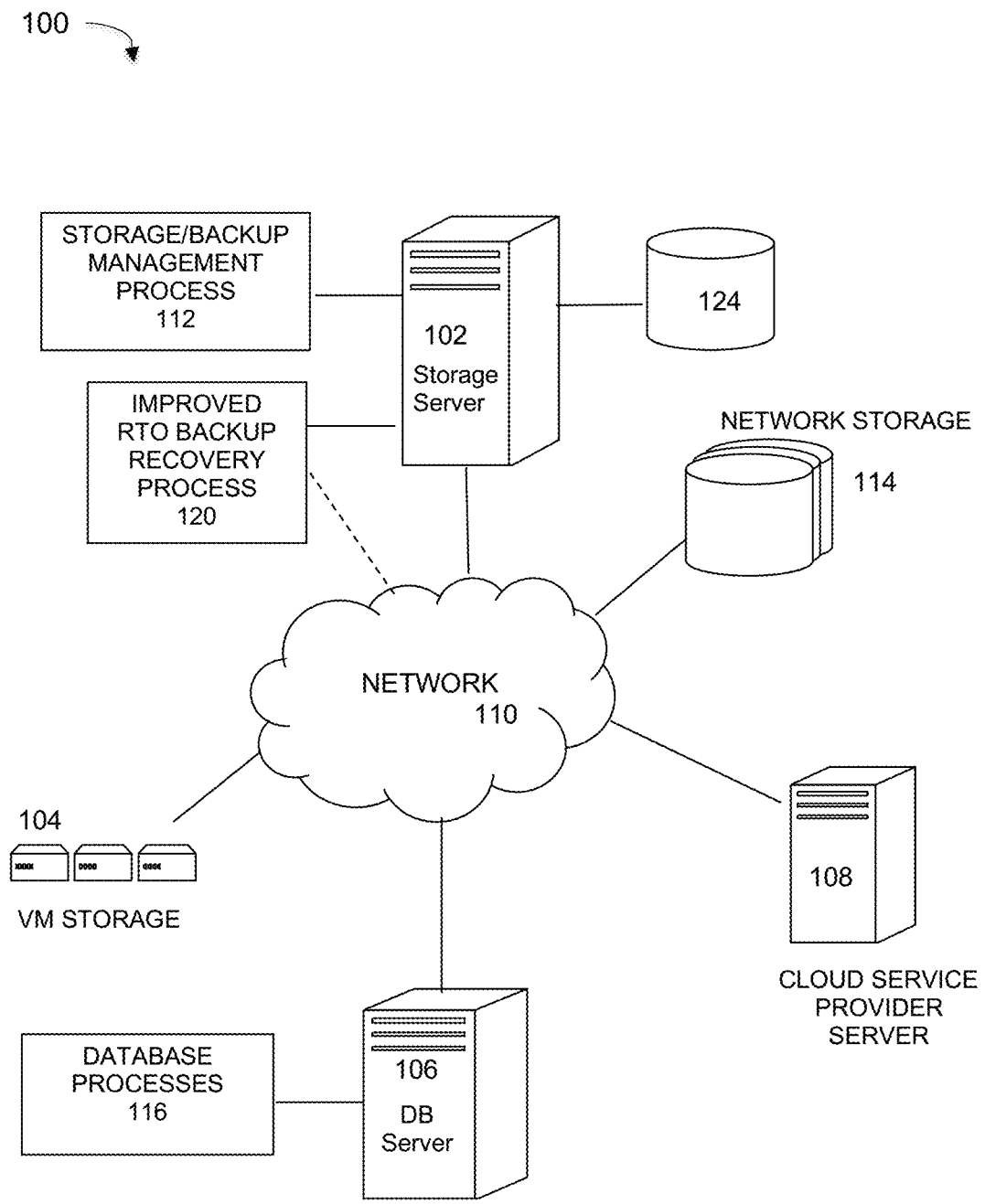
FIG. 1 is a diagram of a cloud computing network implementing a backup recovery process with improved RTO from the cloud, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method to reduce the total downtime drastically by many fold and thereby improve the RTO (recovery time objective) of backup appliances irrespective of amount of total data/metadata are present in the system. As used in the present description, RTO generally refers to application downtime and represents how long it takes to restore the application from failure or cessation until normal operation is restored. The RTO objective may also account for the steps an IT (information technology) department must take to restore the application and its data.

FIG. 1 illustrates a computer network system that implements one or more embodiments of a cloud storage network system implementing an improved RTO backup recovery process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system, or similar deduplication backup system. The cloud tier will have one or more cloud units that are used for data migration and storage using migration, copying, duplication, long-term retention (LTR), and other processes.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes improved RTO backup recovery process 120 that may be executed by the storage server 102 as part of backup management process 112, or it may be executed by a cloud or network 110 resource. Process 120 is configured to copy back only the basic minimum metadata to the on-premises storage during recovery, such as required to bring the filesystem back online, within least possible time window so that a data backup appliance can be made ready to serve data at the earliest with less downtime overall. Most modern file systems have dedicated storage to store metadata locally for efficiency reasons, such as for deduplication of data that is being moved to the cloud. This same storage is leveraged to keep the minimum amount of metadata during a pre-recovery phase. The rest of the metadata can be copied in bulk in background while the backup appliance can continue serving data at the same time. This also necessitates on-demand copying of the portions of metadata chunks, as and when there is a request to access some portions of user files or system metadata files. Embodiments are founded on the premise that a consistent copy of the required metadata would already be available on the cloud tier before a network failure occurs.

Embodiments of process 120 essentially facilitate the backup of data to and from the active storage tier, which may be embodied as local storage 124 (or other readily accessible storage), and cloud storage, which may be embodied as storage media within the cloud 110 or other networked storage 114 or VM storage 104. For purposes of this description, cloud tier storage refers to network or cloud implemented storage media that is used to store data for archival or long-term storage purposes and that imposes a cost in terms of provider fees and/or resource overhead to access; while active tier storage refers to storage that may be faster and smaller than cloud storage, but that is readily accessible and used for temporary storage or present processing of data. The location of a file is generally strictly binary in that it is either in the active tier or on the cloud tier.

Figure 2:
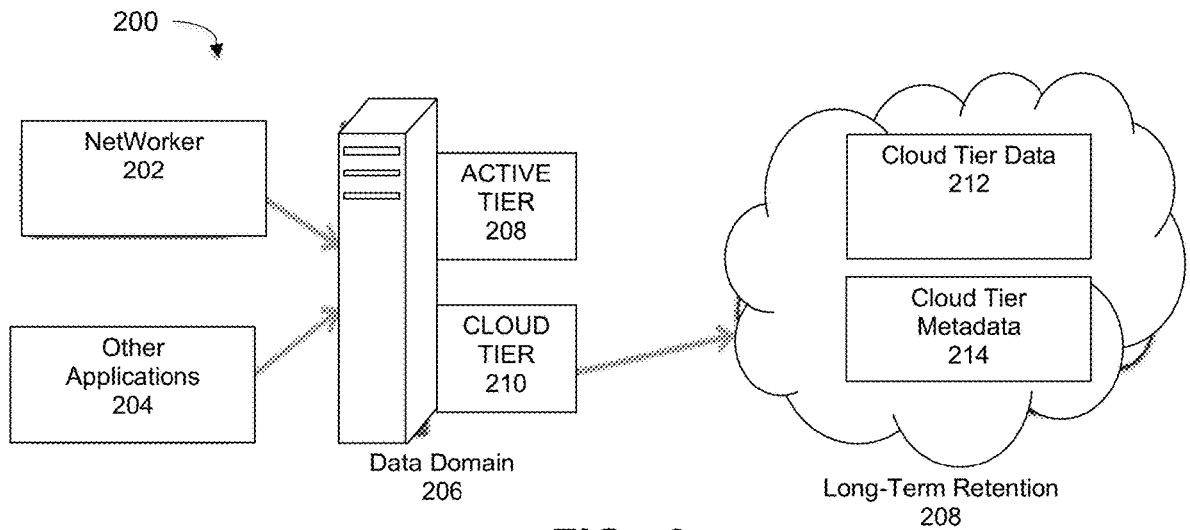
FIG. 2 illustrates a cloud-based deduplication backup system implementing an improved RTO backup recovery process, under some embodiments.

FIG. 2 illustrates a cloud-based deduplication backup system implementing an improved RTO backup recovery process, under some embodiments. System 200 of FIG. 2 is based on a Data Domain system, which is a purpose-built backup appliance providing streaming deduplication. The Data Domain system 206 can process multiple sources of data that need to be protected, such as Networker 202 which provides a policy management interface for the data movement ability of Data Domain, as well as other applications 204. Data Domain is able to ingest, at full network speeds, data from multiple backup sources and takes advantage of tiered data storage technologies (e.g., very large multi-terabyte SATA drive trays, or SSD-enabled fast ingest trays) to utilize cloud archive technologies to enable more efficient long-term archive retention. Although embodiments are described with reference to Data Domain, it should be noted that any other deduplication backup system can also be used.

In system 200, the Data Domain system 206 maintains an active tier 208 and a cloud tier 210 that integrates with a cloud service (e.g., ECS or similar) system embodied as on-premises or hosted private cloud to provide a massively scalable data storage architecture. For the embodiment of FIG. 2, the long term retention (LTR) network is implemented as an ECS-based object storage platform designed around use cases of an ever expanding cloud enabled data center. Object containers can be created as an endless pool and scaled out across an expandable pool of storage nodes for on premise private or hybrid cloud storage. Data is stored as objects and accessed through API calls across multiple protocols including, for example, S3, Swift, and NFS, among others.

The Data Domain system 206 uses a data movement policy that utilizes a cloud unit connector to a cloud provider (e.g., ECS, AWS S3, Virtustream Storage Cloud, etc.). This produces a file system which is represented as an active tier and a cloud tier with a policy engine that moves backup data to the cloud tier data storage 212 when it reaches a minimum data age as stipulated in a policy setup, or other similar criteria. Metadata is stored on a physical cloud tier within the system to facilitate ease of file lookup and recall. Once the logical cloud unit is created, deduplication backup system places a copy of the metadata 214 stored on the cloud tier into the cloud provider bucket via the cloud unit. With respect to FIG. 2, metadata comprises information about the data, such as the index of data segments, layout of the data, index nodes (inodes), etc., while data is the actual customer file data.

Figure 3:
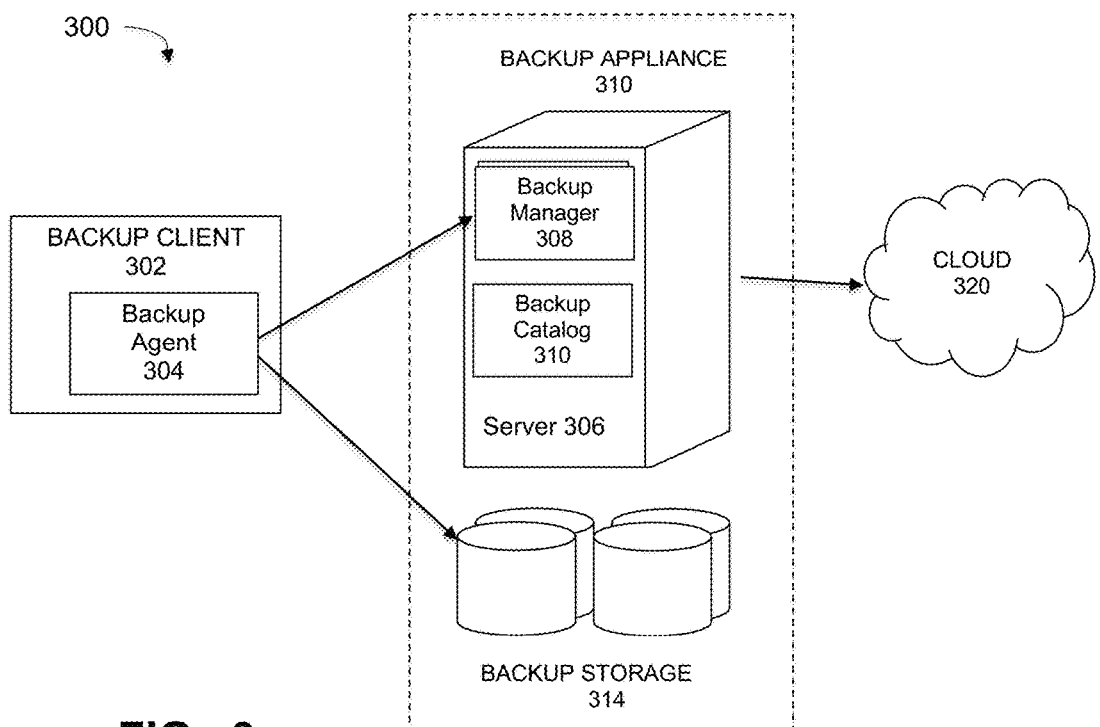
FIG. 3 illustrates an example backup appliance for use in the network of FIG. 2, under some embodiments.

FIG. 3 illustrates an example backup appliance for use in the network of FIG. 2, under some embodiments. As shown in system 300 of FIG. 3, a backup appliance 310 receives data to be backed up from a backup client 302 running a backup agent 304. The backup appliance 310 comprises a backup server 306 executing a backup manager 308 and maintaining a backup catalog 310, as well as backup storage 314, all provided as an integrated product. The backup appliance 310 also includes an interface for connection to cloud 320 and other networks, such as DAS or NAS storage. The backup appliance 310 is typically a physical appliance, but it may also be embodied as a virtual machine on a hypervisor in a virtual environment.

Although embodiments are described with respect to backup appliances that typically integrate backup management and utilities with storage devices, it should be noted that embodiments may also be used with backup solutions using backup software executed on a computer that is separate from the storage resources.

As mentioned above, the EMC Data Domain File System (DDFS) is an example of a multi-tiered deduplication file system that allows files to be moved between cloud storage and active storage tiers, while maintaining one namespace, where the cloud tier is typically associated with long-term storage of data and the active tier is associated with presently processed data. The cloud tier is embodied in long-term retention or storage 208 provided by cloud providers, such as Amazon (e.g., Amazon Web Services, AWS) or Microsoft Azure, or any other public or private cloud provider, such as ECS.

Figure 4:
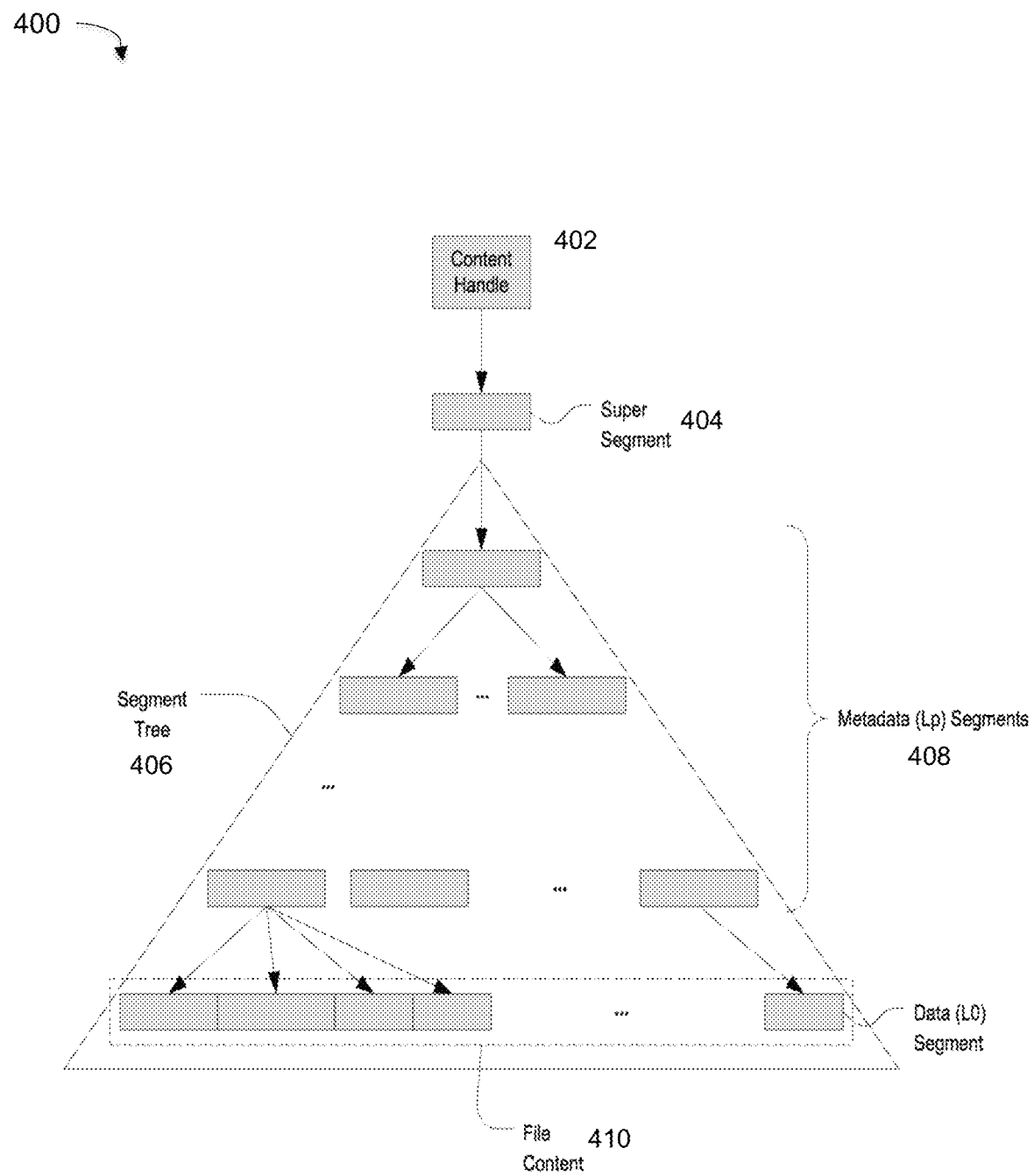
FIG. 4 illustrates the structure of a content handle for use in an RTO optimized backup process, under some embodiments.

In general, Data Domain supports MTree replication and also supports managed file replication (MFR). FIG. 4 illustrates the structure of a content handle for use in an RTO optimized backup process, under an embodiment. As shown in diagram 400, the content handle 402 points to a specific version of the file 410. The leaf nodes in the segment tree 406 are called L0 segments or data segments. The segment tree 406 comprises the metadata (Lp) segments 308. The fingerprints of a group of L0 segments for the file content 410, are collected in the L1 segments. The finger print of a group of L1 segments, is in a L2 segment and so on till L6. L6 is pointed by a super segment 404, which is pointed to by a content handle 402. The content handle is then put in the inode. As is known by Unix users, an index node contains standard file attributes that are needed for all files, such as file ownership, file permissions, file times (creation, access, modification), file size and so on. With respect to FIGS. 2 and 4, the metadata stored as cloud tier metadata 214 comprises the content handle 402, super segment 404, and Lp metadata segments 408. The leaf L0 data segments represent the actual user data.

Optimized RTO Disaster Recovery

Typically, in the event of a total site disaster, a pristine backup appliance with the necessary hardware configuration would be setup identical to that of the operational appliance. This requires appliance specific configurations in terms of storage capacity, cloud profile specifics identical to that of the affected one, and setting up of local metadata storage with identical configurations even before any copy-back of required metadata can be started. Once these initial configurations are made, aspects of process 120 optimize the backup recovery RTO from cloud storage or from the cloud tier.

Figure 5:
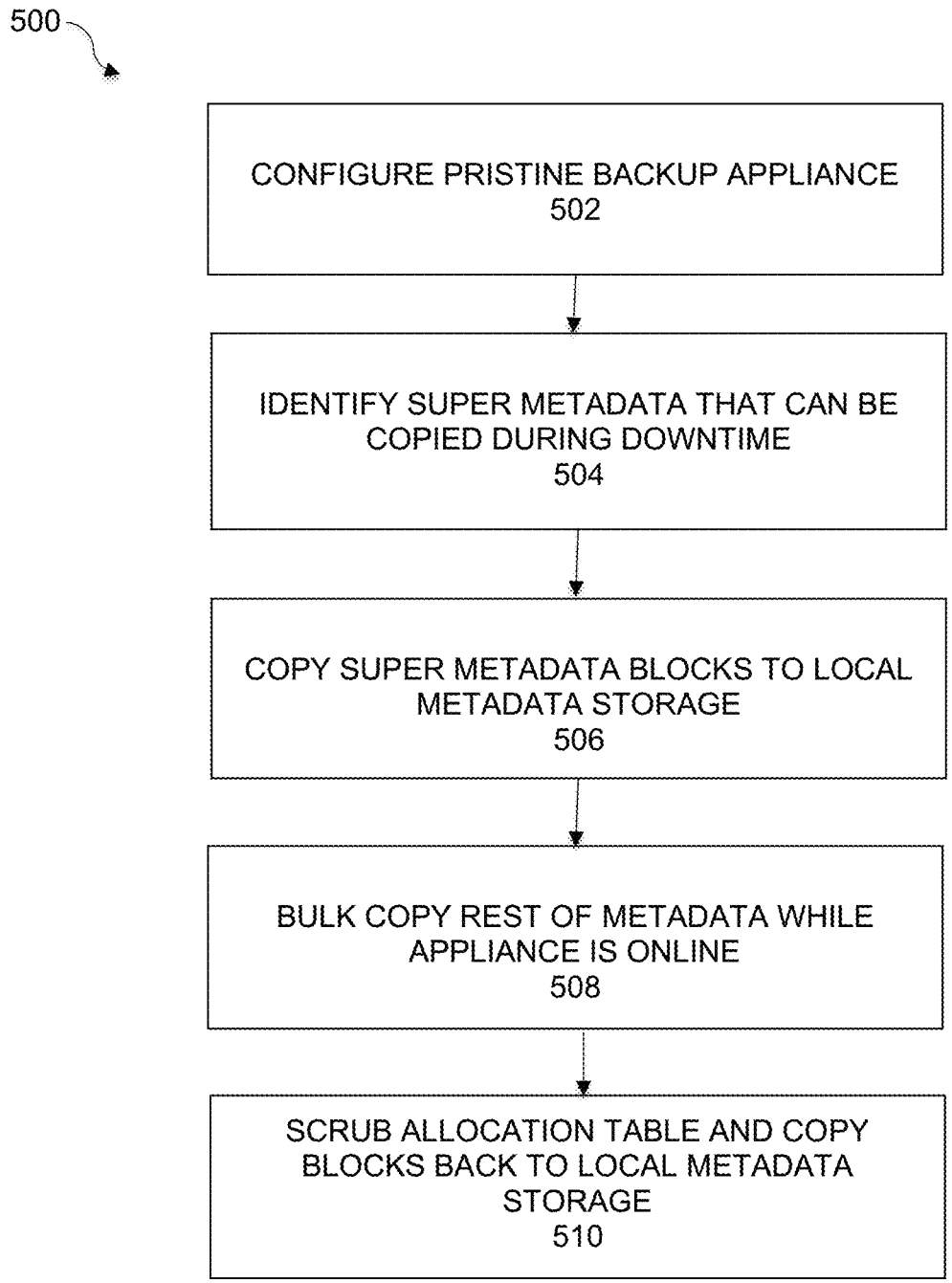
FIG. 5 is a flowchart that illustrates a process of an improved RTO backup recovery process from cloud storage, under some embodiments.

FIG. 5 is a flowchart that illustrates a method of performing an optimized RTO backup recovery, under some embodiments. As shown in FIG. 5, process 500 starts with configuring a pristine backup appliance, 502. Once a pristine appliance is properly configured, super metadata is identified, 504, and the super metadata blocks are then copied from cloud storage to the local metadata storage, 506. The rest of the metadata (other than super metadata) is copied in background or on demand while system is already online and ready to be used. The metadata is typically the largest contributor to the total downtime of an appliance in a disaster recovery process in present systems. This downtime is a factor of two major factors. First, the size of the metadata required to be copied from cloud to local shelves; and second, the network latency of cloud connectivity.

To reduce the first factor, which is the size of the metadata, process 500 performs method steps 506 and 508. In step 506, the process identifies super metadata, which is around 10% or less of the total metadata on the system, that can be copied during downtime. This constitutes enough information that allows the metadata to be reconstructed, albeit with certain gaps or missing metadata. It then bulk copies, as a background process, the rest of the metadata while the appliance is online, 508. This solution identifies the super metadata that can be recovered first from a mirrored copy on the cloud before the filesystem is made operational.

A 'pristine' appliance refers to one which is being used as replacement for old or original appliance that has been lost due to disaster or other event. This pristine appliance will be offline from the customer (user) perspective, until the super metadata copy is complete. Once the super metadata has been copied, this pristine appliance is ready for customer usage, which is time optimized under some embodiments. As it is accessed, the rest of the metadata is copied in the background. The super metadata is also available on-demand for a file that customer needs immediate access to in parallel to the background copy process.

In general, super metadata is metadata that provides enough information about the existence of metadata. It is copied offline, or if a request comes in for a file before the total metadata copy is complete, it helps to validate the request and pull in appropriate pieces of other metadata from the cloud. For example, in a filesystem that consists of metadata and data, where the metadata comprise inodes, allocation maps, block maps, indexes, and so on, the super metadata may refer only to the index and part of the allocation and block maps. The inodes, which constitute the bulk of metadata, does not form part of the super metadata. Furthermore, only directory inodes will be next level of metadata that will be copied to allow access, and then rest of the inodes will be copied in the background or on demand.

Figure 6:
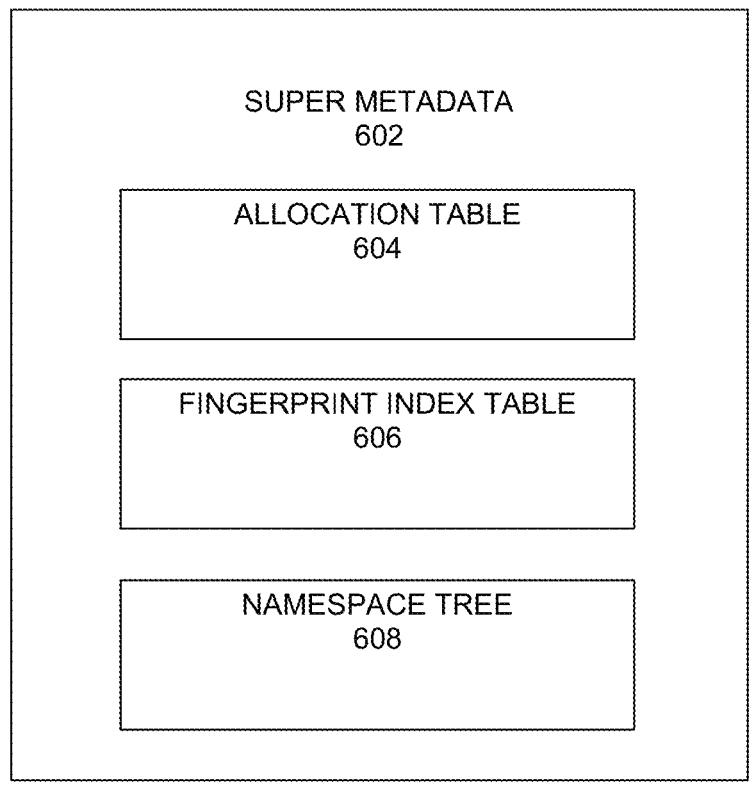
FIG. 6 illustrates some components of super metadata, under some embodiments.

In modern filesystems, the super metadata can largely be defined as illustrated in FIG. 6. As shown in FIG. 6, super metadata 602 comprises an allocation table 604 storing a state for each of the allocated blocks or chunks in the filesystem. The state can be stored as a couple of bits and amounts to a miniscule fraction of the overall metadata. In an efficient design, many disk blocks can be packed into a larger chunk (4 MB to 8 MB) depending on the access pattern and the allocation table can represent the state of these chunks. Typically, this table represents whether a block is allocated or not. A new state denoted "Recovery Pending" is defined to represent the blocks that are not yet recovered.

A fingerprint index table 606 is defined that comprises a mapping of the block fingerprints and the actual block numbers. In a typical filesystem, each block could either be a fixed size or variable size depending on the deduplication algorithm it follows. A fingerprint is typically SHA1/SHA256 key computed on the data contained in the block. A namespace tree 608 is defined that comprises directory hierarchies representing file paths. For example, in a Data Domain filesystem (DDFS), the super metadata comprises of Dtable, Index and the namespace Btrees, in a hierarchy as may be shown in FIG. 4. In general, all the three components of super metadata 602 constitute on the order of up to 10% of the total metadata, in an example filesystem such as DDFS. Clearly, copying just this amount of super metadata from cloud requires significantly less time than copying the entire amount metadata, hence reducing the overall downtime. This is referred to as a "pre-operational recovery" phase (506 in FIG. 5).

Figure 7:
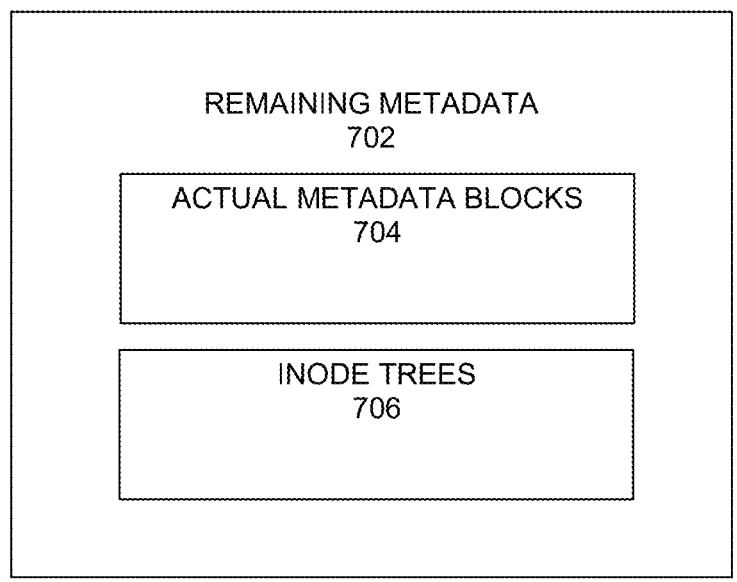
FIG. 7 illustrates a composition of remaining metadata, under some embodiments.

The rest of the metadata while the appliance is online can be copied in background from the mirrored copies saved in cloud in bulk in what is referred to as a "post-operational recovery phase" (508 in FIG. 5). FIG. 7 illustrates a composition of remaining metadata, under some embodiments.

As shown in FIG. 7, this remaining metadata 702 comprises the actual metadata blocks, 704, and inode (index node) trees, 706.

During this post-operational recovery phase, the process spawns a background thread to scrub the allocation table and copy the blocks in "recovery pending" state back to the local metadata storage and update the state as "allocated," step 510. Most of the recovery happens at this stage while the filesystem remains operational.

If any file access request comes in during the post-operational recovery phase 508, the file access workflow should only bring back the relevant metadata of the file and data by looking up the data-structures already copied during the pre-operational recovery phase 506. The cost of copying only the file's metadata is generally negligible compared to the data of the file as file's metadata is hardly around 3% to 5% of a given file.

In process 500, the backup appliance is only down during the pre-operational recovery phase 506, while major chunk of the recovery happens only in post-operational recovery phase 508, allowing customers to access much required backups to restore without requiring metadata for all backups to be copied locally. This can vastly improve the RTO of the backup appliance. For example, consider the case of a user moving a PB of data and 100 million files. After a disaster recovery operation, the user may need to quickly access 1 TB of data. The customer should not need to wait for all back appliances or the entire backup appliance to be recovered. Embodiments allow for the fast recovery of this 1 TB of data by pulling in only the metadata required to read that 1 TB of data.

In general, process 500 can be extended to any file system and even to primary use cases when the metadata required to bring appliance to a usable state is high and the network to access data is slow. Overall, the method provides a way to copy partial filesystem metadata from the cloud and allow the system to get back online quickly. It also provides a way to serve the customer with list of backups, and so on, while the data for backups is still in cloud. It provides a way to serve customer backups by bringing appropriate metadata while recovery is not completely done.

Figure 8:
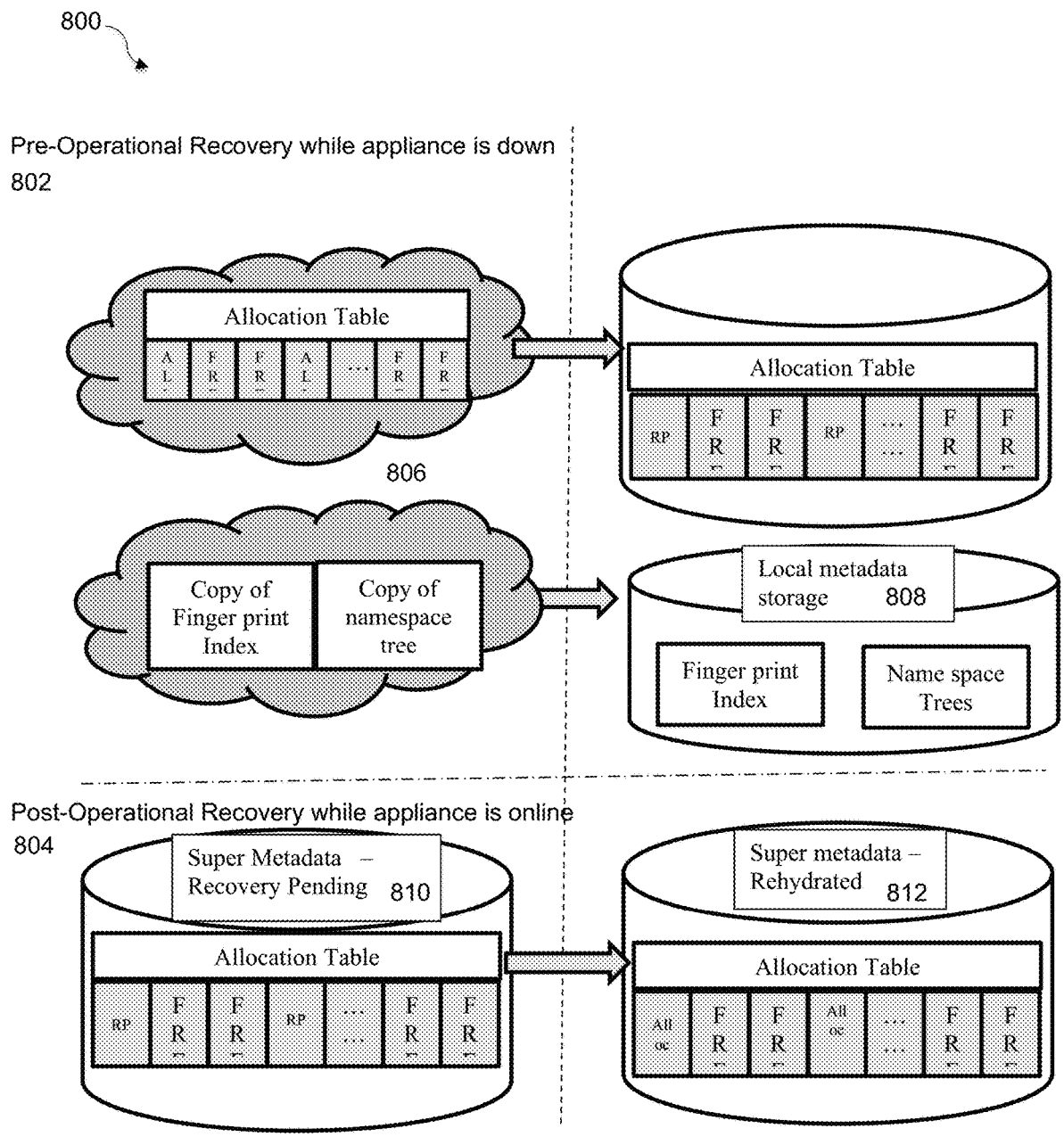
FIG. 8 illustrates a process of backup appliance recovery for the pre-operational and post-operational phases under some embodiments.

FIG. 8 illustrates a process of backup appliance recovery for the pre-operational and post-operational phases under some embodiments. As shown in FIG. 8, the example recovery process 800 includes pre-operational recovery phase 802 followed by post-operational recovery phase 804. The pre-operational recovery phase 802 involves copying from the cloud 806, the allocation table to the local metadata storage 808. A copy of the fingerprint index and a copy of the namespace tree is also made and stored in the local metadata storage 808, as shown. In FIG. 8, blocks of the allocation tables labeled "F" or "FR" are free, while those labeled "AL" or "Alloc" are allocated, and "RP" denotes recovery pending.

The post-operational recovery phase 804 involves copying the rest of the metadata while the appliance is online, while the super metadata was already copied in the pre-operational recovery phase, as mentioned above. After all the metadata blocks are copied, the state of the super metadata is set as 'rehydrated', 812. Also during this phase, a background thread is spawned to copy back the actual metadata blocks marked as 'recovery pending' 810 in the "allocation table. The copied blocks are scrubbed in batches and marked as 'allocated' as depicted in FIG. 8, 804. Once all the blocks in "recovery pending" are marked as allocated, the allocation table and the corresponding metadata blocks are considered to be rehydrated, 812. Although this could take an amount of time proportional to the size of the metadata, the filesystem is online at this stage to serve incoming requests. Any access to file during this time would copy back only the file's metadata to the local storage and mark the blocks as allocated.

Embodiments can be used in conjunction with Data Domain systems, but are not so limited. The illustrated Data Domain cloud tier recovery is provided as an example to show that recovery timeline can be significantly reduced from months or weeks to hours or days, with up to 90% reduction in RTO before customer can even start to recover any backup that is in the cloud. This provides a competitive advantage with other appliances that require excessive time to recover a full appliance from the cloud. Existing systems generally do not allow on-demand disaster recovery while the appliance is online. Serving data from the appliance while disaster recovery is in progress is a key feature under some embodiments.

Although embodiments are described with respect to backup appliances, it should be noted that any primary file system server or network appliance can be used; likewise, DR storage can comprise not only cloud storage, but any replica storage, media such as disk, solid state drive, tape drive, and so on.

System Implementation

Embodiments of the processes and techniques described above can be implemented on any appropriate backup system operating environment or file system, or network server, or object file system. Such embodiments may include other or alternative data structures or definitions as needed or appropriate.

Figure 9:
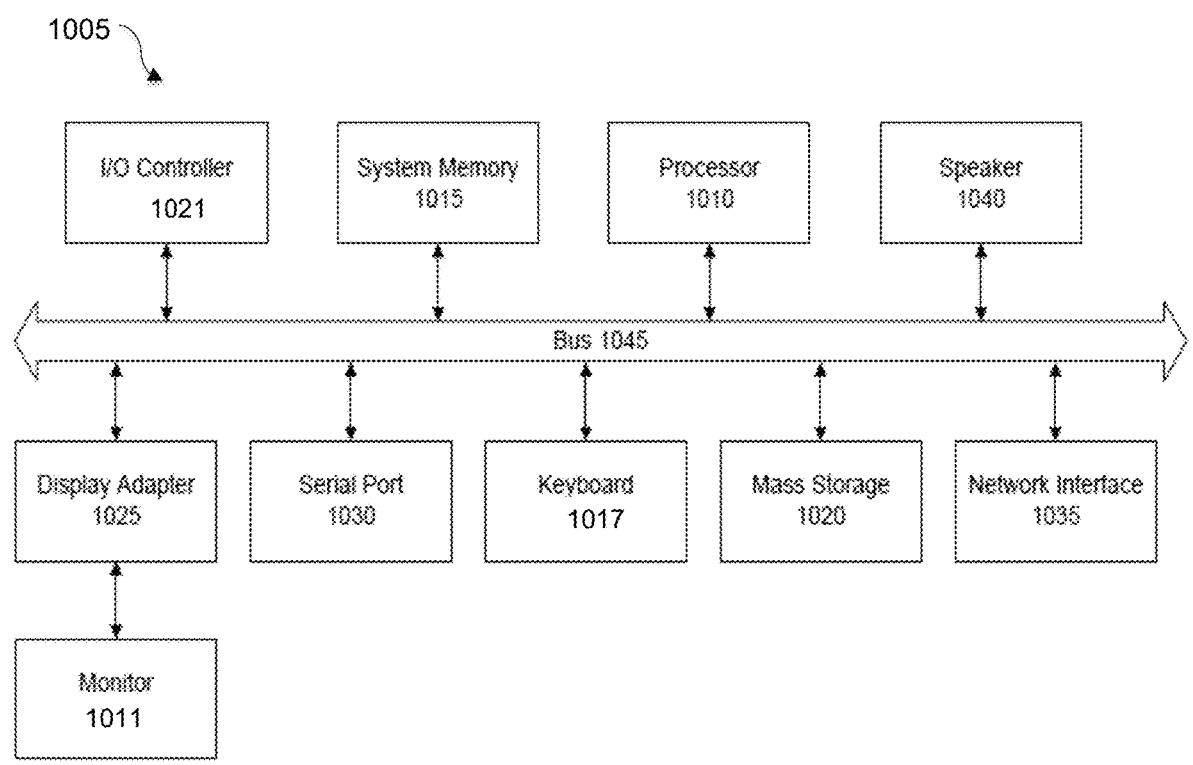
FIG. 9 is a system block diagram of a computer system used to execute one or more software components of the backup appliance recovery process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing data recovery from cloud storage to a file system server comprising a backup appliance that goes from an offline state to an online state, comprising:
    identifying super metadata among metadata stored in the cloud storage for the file system server, wherein the super metadata comprises an amount on the order of ten percent or less of the metadata representing a minimum amount of information to reconstruct the metadata;
    copying the super metadata blocks from the cloud storage to local metadata storage of the file system server while it is in the offline state to leave remaining metadata; and
    copying the remaining metadata blocks from the cloud storage to the local metadata storage while the file system server is in the online state, wherein the remaining metadata blocks are copied as bulk copies copied in a background process, and further wherein the super metadata is recovered first from a mirrored copy on the storage before a filesystem of the file system server is made operational, wherein the super metadata comprises a data structure including an allocation table, a fingerprint index table, and a namespace tree.

2. The method of claim 1 wherein the cloud storage comprises storage media resident in a cloud computing network maintained by a cloud service provider, and provided for long term retention of data processed using the metadata.

3. The method of claim 1 wherein the metadata other than the super metadata comprises index node (inode) trees of the metadata and actual metadata blocks.

4. The method of claim 1 further comprising:
    spawning a background thread to scrub the allocation table and copy the metadata blocks in a recovery pending state back to the local metadata storage; and
    updating the recovery pending state as 'allocated' after copying the metadata blocks from the recovery pending state.

5. The method of claim 1 wherein the backup appliance comprises part of a deduplication backup system executed by a data storage server running a Data Domain file system (DDFS).

6. The method of claim 5 wherein the metadata is stored in a segment tree, and wherein leaf nodes in the segment tree comprise L0 segments or data segments, and the segment tree comprises the metadata (Lp) segments.

7. The method of claim 5 wherein the allocation table stores a state for each of the allocated blocks or chunks in the filesystem and represents whether a block is allocated or not, the fingerprint index table comprises a mapping of the block fingerprints and the actual block numbers wherein each block could either be a fixed size or variable size depending on a deduplication method, and wherein the namespace tree comprises directory hierarchies representing file paths.

8. A system comprising:
a backup appliance including local backup storage and executing a backup manager and storing data and associated metadata in an active tier and a cloud tier, wherein the cloud tier comprises storage media resident in a cloud computing network maintained by a cloud service provider, and provided for long term retention of data including the file, and the active tier comprises the local backup storage of the backup appliance; and
a cloud network storing data as for the backup appliance as cloud tier data and storing the metadata as cloud tier metadata, wherein a process of the backup appliance identifies super metadata among metadata stored in the cloud storage, the super metadata representing a minimum amount of information to reconstruct the metadata, copies the super metadata blocks from the cloud tier to the active tier while the backup appliance is offline to leave remaining metadata, and copies the remaining metadata blocks from the cloud tier to the active tier while the backup appliance is online, wherein the backup appliance comprises part of a deduplication backup system executed by a data storage server running a Data Domain file system (DDFS), and further wherein the super metadata comprises a data structure including an allocation table, a fingerprint index table, and a namespace tree.

9. The system of claim 8 wherein the allocation table stores a state for each of the allocated blocks or chunks in the filesystem and represents whether a block is allocated or not, the fingerprint index table comprises a mapping of the block fingerprints and the actual block numbers wherein each block could either be a fixed size or variable size depending on a deduplication method, and wherein the namespace tree comprises directory hierarchies representing file paths.

10. The system of claim 8 wherein the metadata other than the super metadata comprises actual metadata blocks and index node (inode) trees.

11. The system of claim 10 wherein the metadata is stored in a segment tree, and wherein leaf nodes in the segment tree comprise L0 segments or data segments, and the segment tree comprises the metadata (Lp) segments.

12. A method comprising:
configuring, in the event of a failure, a new backup appliance identical to an original backup appliance, the original backup appliance maintaining copies of data and associated metadata for one or more data sources in cloud storage;
copying, from the cloud storage, metadata blocks from the cloud storage to local storage of the new backup appliance;
identifying, in a pre-recovery phase, super metadata representing minimum metadata to reconstruct the metadata on the new backup appliance to leave remaining metadata, wherein the super metadata comprises a data structure including an allocation table, a fingerprint index table, and a namespace tree, and wherein user access comprises writing new data, accessing files, and listing files;
copying the super metadata from the cloud to the new backup appliance while the original backup appliance is offline and not available for user access due to the failure; and
copying, as a background task or as an on-demand process, the remaining metadata from the cloud to the new backup appliance while the new backup appliance is online and the user can access the backup appliance as if data recovery is complete.

13. The method of claim 12 wherein the remaining metadata comprises actual metadata blocks and index node (inode) trees.

* * * * *